United States Patent
Koskela et al.

(10) Patent No.: US 9,439,117 B2
(45) Date of Patent: Sep. 6, 2016

(54) HANDOVER TO CELL SUPPORTING MULTIPLE FREQUENCY BANDS

(71) Applicant: Nokia Technologies Oy, Espoo (FI)

(72) Inventors: Jarkko Koskela, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/434,516

(22) PCT Filed: Oct. 22, 2013

(86) PCT No.: PCT/IB2013/059548
§ 371 (c)(1),
(2) Date: Apr. 9, 2015

(87) PCT Pub. No.: WO2014/064616
PCT Pub. Date: May 1, 2014

(65) Prior Publication Data
US 2015/0271722 A1    Sep. 24, 2015

Related U.S. Application Data

(60) Provisional application No. 61/716,813, filed on Oct. 22, 2012.

(51) Int. Cl.
*H04W 36/06* (2009.01)
*H04W 72/04* (2009.01)
(Continued)

(52) U.S. Cl.
CPC ......... *H04W 36/06* (2013.01); *H04W 36/0066* (2013.01); *H04W 72/0453* (2013.01); *H04W 8/24* (2013.01)

(58) Field of Classification Search
CPC ........... H04W 36/0061; H04W 36/06; H04W 36/0083; H04W 72/0453; H04W 36/0072; H04W 36/0066; H04W 36/00; H04W 36/0016; H04W 36/08; H04W 36/18

USPC ........ 455/436, 450; 370/331, 225, 252, 350; 380/272

See application file for complete search history.

(56) References Cited

U.S. PATENT DOCUMENTS

2012/0202487 A1    8/2012  Kazmi et al.
2012/0207040 A1*   8/2012  Comsa ............. H04W 72/1215
                                               370/252

(Continued)

FOREIGN PATENT DOCUMENTS

EP    2249607 A1    11/2010
SE    WO2012023895   *  2/2012  ............ H04W 72/04
WO    2012/023895 A1    2/2012

OTHER PUBLICATIONS

"3rd Generation Partnership Project; Technical Specification Group Radio Access Network; Extending 850 MHz study Technical Report (Release 11)", 3GPP TR 37.806, V11.0.0, Oct. 2012, pp. 1-93.

(Continued)

*Primary Examiner* — Inder Mehra
(74) *Attorney, Agent, or Firm* — Nokia Technologies Oy

(57) ABSTRACT

Methods, apparatuses, and computer program products for handover to cell supporting multiple frequency bands are provided. One method comprises indicating, by a UE, supported bands to a serving eNB, and indicating to the serving eNB that the UE can be handed over to any band overlapping with the supported bands. The method may also include receiving the EARFCN of a target eNB from the serving eNB, and connecting to the target eNB regardless of whether the EARFCN corresponds to any band indicated by the target eNB as being supported and/or regardless of whether the EARFCN is equal to an EARFCN indicated as being used by the target eNB. The indicating may further include indicating to the serving eNB that the UE will not autonomously terminate connection with a target cell if the target eNB does not transmit in any of the indicated supported bands.

20 Claims, 5 Drawing Sheets

(51) Int. Cl.
*H04W 36/00* (2009.01)
*H04W 8/24* (2009.01)

(56) References Cited

U.S. PATENT DOCUMENTS

| | | | |
|---|---|---|---|
| 2013/0003533 A1* | 1/2013 | Barbieri | H04W 36/06 370/225 |
| 2013/0079012 A1* | 3/2013 | Kubota | H04W 48/12 455/437 |
| 2014/0248889 A1* | 9/2014 | Van Lieshout | H04W 36/0083 455/450 |
| 2015/0071249 A1* | 3/2015 | Hu | H04W 36/0022 370/331 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.1.0, Sep. 2012, pp. 1-325.

International Search Report and Written Opinion received for corresponding Patent Cooperation Treaty Application No. PCT/IB2013/059548, dated Mar. 26, 2014, 19 pages.

"UE Mobility in Multiple Bands NW", 3GPP TSG-RAN WG2 #80, R2-125807, Agenda item: 4.1, LG Electronics Inc., Nov. 12-16, 2012, pp. 1-3.

* cited by examiner

HANDOVER TO CELL SUPPORTING MULTIPLE FREQUENCY BANDS

RELATED APPLICATION

This application was originally filed as Patent Cooperation Treaty Application No. PCT/IB2013/059548 filed Oct. 22, 2013 which claims priority benefit to U.S. Provisional Patent Application No. 61/716,813, filed Oct. 22, 2012.

BACKGROUND

1. Field

Embodiments of the invention generally relate to wireless communication systems, such as, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A).

2. Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN) no RNC exists and most of the RNC functionalities are contained in the eNodeB (evolved Node B).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD). Advantages of LTE are, for example, high throughput, low latency, FDD and TDD support in the same platform, an improved end-user experience, and a simple architecture resulting in low operating costs.

Further releases of 3GPP LTE (e.g., LTE Rel-11, LTE-Rel-12) are targeted towards future international mobile telecommunications advanced (IMT-A) systems, referred to herein for convenience simply as LTE-Advanced (LTE-A). LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment is directed to an apparatus including at least one processor, and at least one memory comprising computer program code. The at least one memory and the computer program code are configured, with the at least one processor, to cause the apparatus at least to indicate at least one supported band of the apparatus to a serving station, indicate to the serving station that the apparatus can be handed over to any band overlapping with the indicated at least one supported band, and receive an absolute radio frequency channel number of a target station from the serving station and connect to the target station regardless of whether the absolute radio frequency channel number corresponds to any band indicated by the target station as being supported and/or regardless of whether the absolute radio frequency channel number is equal to an absolute radio frequency channel number indicated as being used by the target station.

Another embodiment is directed to a method including indicating, by a user equipment, at least one supported band of the user equipment to a serving station, and indicating to the serving station that the user equipment can be handed over to any band overlapping with the indicated at least one supported band. The method may further include receiving an absolute radio frequency channel number of a target station from the serving station and connecting to the target station regardless of whether the absolute radio frequency channel number corresponds to any band indicated by the target station as being supported and/or regardless of whether the absolute radio frequency channel number is equal to an absolute radio frequency channel number indicated as being used by the target station.

Another embodiment is directed to an apparatus including at least one processor, and at least one memory comprising computer program code. The at least one memory and the computer program code are configured, with the at least one processor, to cause the apparatus at least to receive an indication of at least one supported band from a user equipment, determine whether a second indication has been received from the user equipment that the user equipment can be handed over to any band overlapping with the indicated at least one supported band, and determine an absolute radio frequency channel number of a potential handover target station for the user equipment. When the second indication has been received, the apparatus may be further caused to verify whether at least one of the indicated at least one supported band comprises a frequency channel corresponding to the determined absolute radio frequency channel number of the potential handover target station, and initiate a handover of the user equipment to the target station based on the verification of whether at least one of the indicated at least one supported band comprises a frequency channel corresponding to the determined absolute radio frequency channel number.

Another embodiment is directed to a method including receiving, by a serving station, an indication of at least one supported band from a user equipment, determining whether a second indication has been received from the user equipment that the user equipment can be handed over to any band overlapping with the indicated at least one supported band, and determining an absolute radio frequency channel number of a potential handover target station for the user equipment. The method may further include, when the second indication has been received, verifying whether at least one of the indicated at least one supported band comprises a frequency channel corresponding to the determined absolute radio frequency channel number of the potential handover target station. The method may then include initiating a handover of the user equipment to the target station based on the verification of whether at least one of the indicated at least one supported band comprises a frequency channel corresponding to the determined absolute radio frequency channel number.

Another embodiment is directed to an apparatus including at least one processor, and at least one memory comprising computer program code. The at least one memory and the computer program code are configured, with the at least one processor, to cause the apparatus at least to indicate at least one supported band of the apparatus to a serving station, indicate to the serving station that the apparatus can be handed over to any band overlapping with the indicated at least one supported band, wherein the indication to the serving station that the apparatus can be handed over to any band overlapping with the indicated at least one supported bands further comprises an indication that the apparatus will not autonomously terminate connection with a target cell if the target cell does not transmit in any of the indicated at least one supported band.

Another embodiment is directed to a method including indicating, by a user equipment, at least one supported band of the user equipment to a serving station, and indicating to the serving station that the user equipment can be handed over to any band overlapping with the indicated at least one supported band, wherein the indication to the serving station that the apparatus can be handed over to any band overlapping with the indicated at least one supported bands further comprises an indication that the apparatus will not autonomously terminate connection with a target cell if the target cell does not transmit in any of the indicated at least one supported band.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of the invention, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

A wireless standard may define one or more frequency band modes and a frequency band mode may designate a radio frequency (RF) band and a set of operational RF restrictions. The frequency band may be divided into a set of frequency channels and the RF restriction may define the allowed frequency channel bandwidths, transmitting power level, spectrum emission mask, a receiver frequency filter, and the like. Thus, a user equipment (UE) in compliance with one frequency band mode may communicate with and roam into a wireless network that supports the same frequency band mode.

It is not uncommon that one frequency band mode has overlapping frequency channels with another frequency band mode. For example, the UEs of the first frequency band mode may roam into a wireless cell of the second frequency band mode. Yet, the UE of the first frequency band mode may not access the base station if it has no understanding of the second frequency band even if the UE would have been able to fulfill the requirements of the second frequency band mode. Such a situation for example occurs if definitions of the second frequency band are not defined in the UE, something which may occur if the second frequency band was defined in a release version of a standard later than the release version of the standard the UE complies with.

The frequency band modes supported by the UE may be indicated to the network in a UE capability signaling. The frequency band mode supported by the network may be signaled to the UE in a broadcast signaling. A specific frequency numbering scheme is associated with each frequency band mode.

Figure 1:
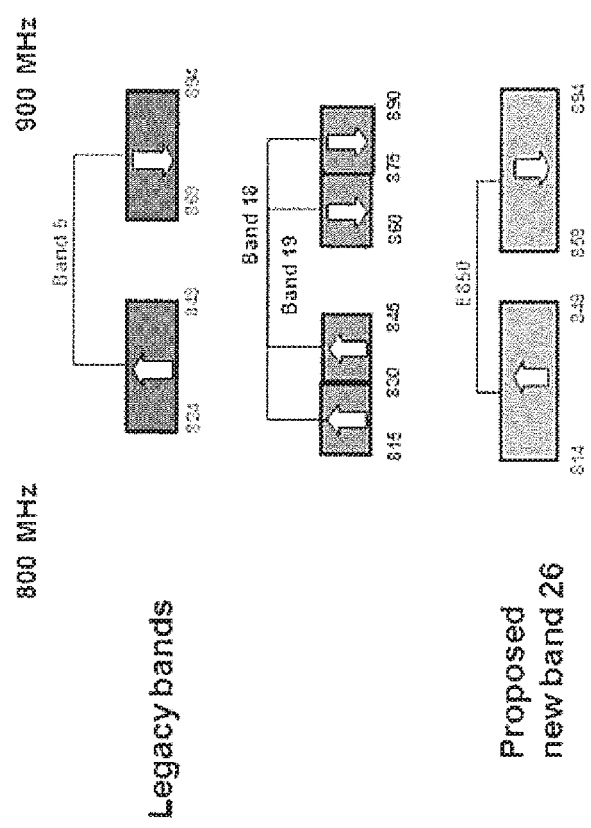
FIG. 1 illustrates an example of new Band 26 covering the existing Band 5 on 850 MHz and the Band 18/19.

FIG. 1 illustrates an example of the extension of the general 850 MHz band (E850). In this example, FIG. 1 illustrates the proposed new Band 26 covering the existing Band 5 on 850 MHz and the Band 18/19. As depicted in FIG. 1, the new band 26 may be created by extending the existing Band 5 by 10 MHz to cover Band 5, 18 and 19 in a single duplexer to harmonize existing bands and to increase the amount of available spectrum in certain regions. A UE supporting the new band should be able to roam into the networks operating on the legacy bands. Depending on the frequency bands, the legacy band UEs could also roam to a new band network and camp on the overlapping part of the new band.

Additionally, there are other similar cases of overlapping operating bands. For example, these similar cases of overlapping bands may include: Band 25 overlapping with Band 2, Band 3 overlapping with Band 9, and Band 41 overlapping with Band 38. Further, it should be noted that more bands including multiple bands may be introduced in the future, and embodiments of the invention are equally applicable to these cases.

Returning to the new Band 26 example, the Band 26 UE can indicate the support of Band 5/18/19 in its capability. Then, the Band 26 UE will be able to roam into the Band 5/18/19 network. If there is a need to support roaming for the Band 5/18/19 UE on the overlapping part of Band 26, the Band 26 network could also broadcast Band 5/18/19 in the system information (SI). For instance, the network may broadcast only Band 26 on non-overlapping parts of Band 26 so that the Band 5/18/19 UE will not camp on the extension part. If there would be cells comprising both the overlapping part and non-overlapping part of Band 26, these cells would most likely only broadcast Band 26 so that the Band 5/18/19 UE will not be able to camp on the non-overlapping part.

In this disclosure, the primary band is the band indicated in the legacy signaling, and the secondary bands are the additional bands which indicate that UEs supporting those bands can camp there as well. Secondary bands may be indicated in extension signaling.

Some vendors have raised the concern that existing UEs may be performing certain actions based on a legacy part of band indicator, which may cause problems in the handover procedure. This may occur, for instance, when an existing UE supporting band A (may support other bands) is in RRC_CONNECTED mode in a cell (in a band UE supports), and then the network handovers to a cell which has band A in the extension signaling but not in the legacy part of signaling. This situation may, therefore, lead to a handover procedure that does not work correctly.

Accordingly, a problem may arise when the UE supports any band that may become overlapping with a band that is introduced later than when the UE was deployed. If such a UE is handed over to a cell where the UE supported band is only in the extension signaling, then the UE may behave improperly.

Another problem may arise as to how to handle UEs that are already deployed supporting bands that have overlapping bands defined and those UEs do not support multiple band signaling (e.g., such UEs are not able to comprehend extension signaling).

Some solutions have been identified in RAN2 to address the above-noted problems. One proposal is to disallow UE implementation to perform any actions based on broadcast signaling. A possible issue with this proposal is that, for existing UEs, this violates the principle that dedicated signaling equals to broadcast signaling. Another proposal is to capture limitations in network deployment, e.g., mandate lowest band number in legacy part of band indicators. However, in UMTS this may not be a viable option and for some bands it may not be viable either. For example, some operators may acquire bands from another operator and it probably would be very difficult to mandate some specific order of band in the system information blocks (SIBs). A third proposal is for the UE to indicate for which band it understands E-UTRA absolute radio frequency channel numbers (EARFCNs) so that the network knows if the UE can understand the first band in the signaling. As a result, the UE cannot be handed over to a cell which does not broadcast in legacy freqBandIndicator UE supported EARFCN, and this would cause a great deal of signaling in UE capabilities. Yet another proposal is that the network does not make handover in a scenario where the UE does not support the first band in the signaling. However, this proposal has undesirable network implementation limitations.

In view of the issues outlined above, one embodiment of the present invention provides an indication to the network of whether the UE supports handover to any cell that complies to at least one of the UE supported band(s). In other words, the target cell does not need to broadcast the UE supported band in legacy signaling. Accordingly, it is not necessary to broadcast/indicate to the UE the UE supported band in any of the band indicators thereby ensuring the future proofness. In this way, the network knows if it can perform the handover to the target cell not broadcasting the UE supported band in a legacy band indicator.

In one embodiment, the UE capability may indicate at least one of following: 1) the UE can be handed over to any cell that complies to at least one of the UE supported band(s) regardless of whether the band is indicated in the target cell freqBandIndicator (but possibly in the new multiple frequency band indicators); 2) the UE does not do any autonomous actions based on broadcast SIBs; 3) the UE indicates for which bands the UE can understand EARFCNs. Inclusion of this list may mean the optimization of option 1), i.e., the UE can be handed over to any cell that complies to the UE supported band(s) regardless of whether the band is indicated in the target cell freqBandIndicator (but possibly in the new multiple frequency band indicators). This way UE may be handed over to a cell of EARFCN that the UE does not understand (but UE cannot camp on such a cell) and, thus, providing a better solution than just listing supported EARFCNs; and 4) the UE does not utilize broadcast information in CONNECTED mode except for parts that it is clearly indicated to be used.

Figure 2B:
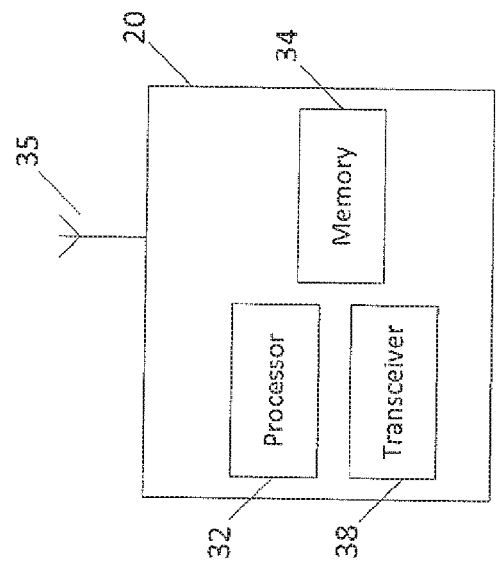
FIG. 2b illustrates an apparatus according to another embodiment.
Figure 2A:
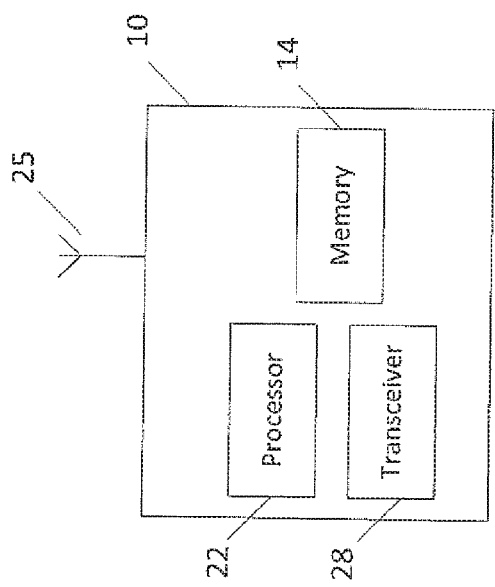
FIG. 2a illustrates an apparatus according to one embodiment.

FIG. 2a illustrates an example of an apparatus 10 according to an embodiment. In one embodiment, apparatus 10 may be a UE. It should be noted that one of ordinary skill in the art would understand that apparatus 10 may include components or features not shown in FIG. 2a. Only those components or feature necessary for illustration of the invention are depicted in FIG. 2a.

As illustrated in FIG. 2a, apparatus 10 includes a processor 22 for processing information and executing instructions or operations. Processor 22 may be any type of general or specific purpose processor. While a single processor 22 is shown in FIG. 2a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a UE. In this embodiment, apparatus 10 may be controlled by memory 14 and processor 22 to indicate its supported bands to a serving eNB, for example, in a capability information message. According to an embodiment, apparatus 10 may be further controlled by memory 14 and processor 22 to indicate to the serving eNB that it can be handed over to any band overlapping with the indicated supported bands. Apparatus 10 may also be further controlled by memory 14 and processor 22 to receive the EARFCN of the target eNB from the serving eNB and connect to the target eNB regardless of whether the EARFCN corresponds to any band indicated by the target eNB as being supported (in FBI in SIB1) or regardless of whether the EARFCN is equal to an EARFCN indicated as being used by the target eNB.

FIG. 2b illustrates an example of an apparatus 20 according to another embodiment. In an embodiment, apparatus 20 may be a base station, such as an eNB. In one embodiment, apparatus 20 may be a serving eNB for apparatus 10 discussed above. It should be noted that one of ordinary skill in the art would understand that apparatus 20 may include components or features not shown in FIG. 2b. Only those components or feature necessary for illustration of the invention are depicted in FIG. 2b.

As illustrated in FIG. 2b, apparatus 20 includes a processor 32 for processing information and executing instructions or operations. Processor 32 may be any type of general or specific purpose processor. While a single processor 32 is shown in FIG. 2b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulates information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a base station, such as a serving eNB. In this embodiment, apparatus 20 may be controlled by memory 34 and processor 32 to receive an indication of supported bands from the UE. According to an embodiment, apparatus 20 may be controlled by memory 34 and processor 32 to receive an indication from the UE that the UE can be handed over to any band overlapping with the indicated supported bands. In an embodiment, apparatus 20 may then be controlled by memory 34 and processor 32 to determine the EARFCN of a potential handover target eNB for the UE and to verify whether at least one of the indicated supported bands comprises a frequency channel corresponding to the determined EARFCN of the potential handover target eNB. Apparatus 20 may then be controlled by memory 34 and processor 32 to initiate the handover of the UE to the target eNB based on the verification of whether at least one of the indicated supported bands comprises a frequency channel corresponding to the determined EARFCN.

In another embodiment, apparatus 20 may then be controlled by memory 34 and processor 32 to determine whether a potential handover target cell supports any of the indicated supported bands as primary or secondary band. Apparatus 20 may then be controlled by memory 34 and processor 32 to initiate the handover of the UE from the apparatus to the target cell based on the verification of whether at least one of the indicated supported bands is supported by the target cell.

In one embodiment, the target eNB does not indicate support for each of the supported bands. The target eNB may utilize a Long Term Evolution protocol and does not indicate support for each of the supported bands in a frequency band indicator in FBI in SIB1.

According to certain embodiments, the EARFCN is defined in a protocol release that is later than a protocol release supported by the UE. Additionally, the serving eNB may translate the EARFCN to a corresponding EARFCN of one of the supported bands and indicates the corresponding EARFCN to the UE for the purpose of measurement. In one embodiment, the measurement results may be used in the decision of whether to handover the UE to target. According to some embodiments, the serving eNB signals the handover to the target eNB, in part, by sending the corresponding EARFCN to the UE.

Figure 3A:
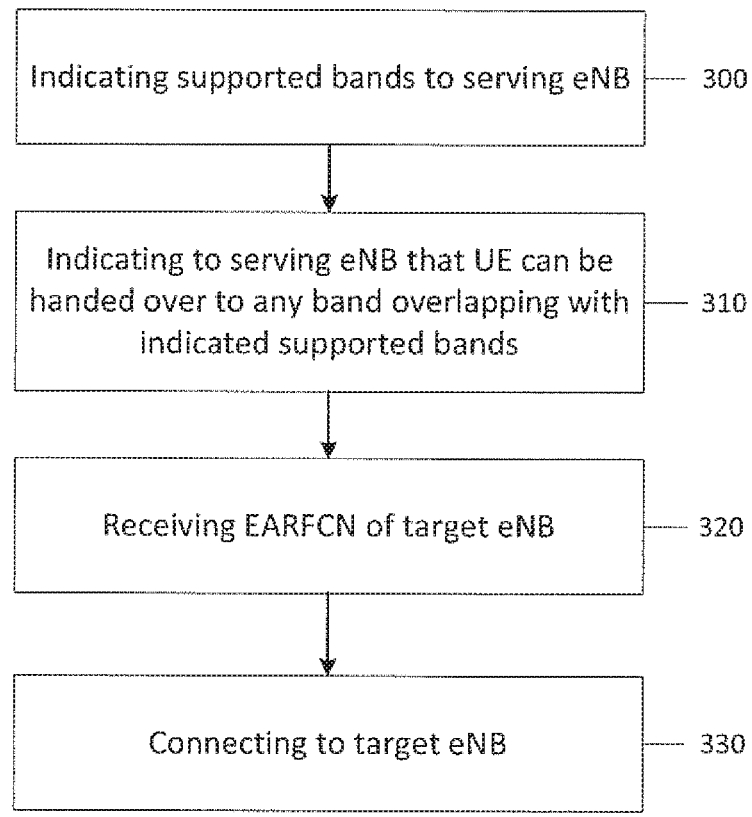
FIG. 3a illustrates a flow diagram of method according to one embodiment.

FIG. 3a illustrates a flow diagram of a method of handover to a cell supporting multiple frequency bands, according to one embodiment. In one example embodiment, the method illustrated in FIG. 3a may be performed by a UE. According to one embodiment, the method includes, at 300, indicating supported bands to a serving eNB in, for example, a capability information message. At 310, the method may include indicating to the serving eNB that the UE can be handed over to any band overlapping with the supported bands indicated at 300. The method may then include, at 320, receiving the EARFCN of the target eNB from the serving eNB. At 330, the method may include connecting to the target eNB regardless of whether the EARFCN corresponds to any band indicated by the target eNB as being supported and/or regardless of whether the EARFCN is equal to an EARFCN indicated as being used by the target eNB.

Figure 3B:
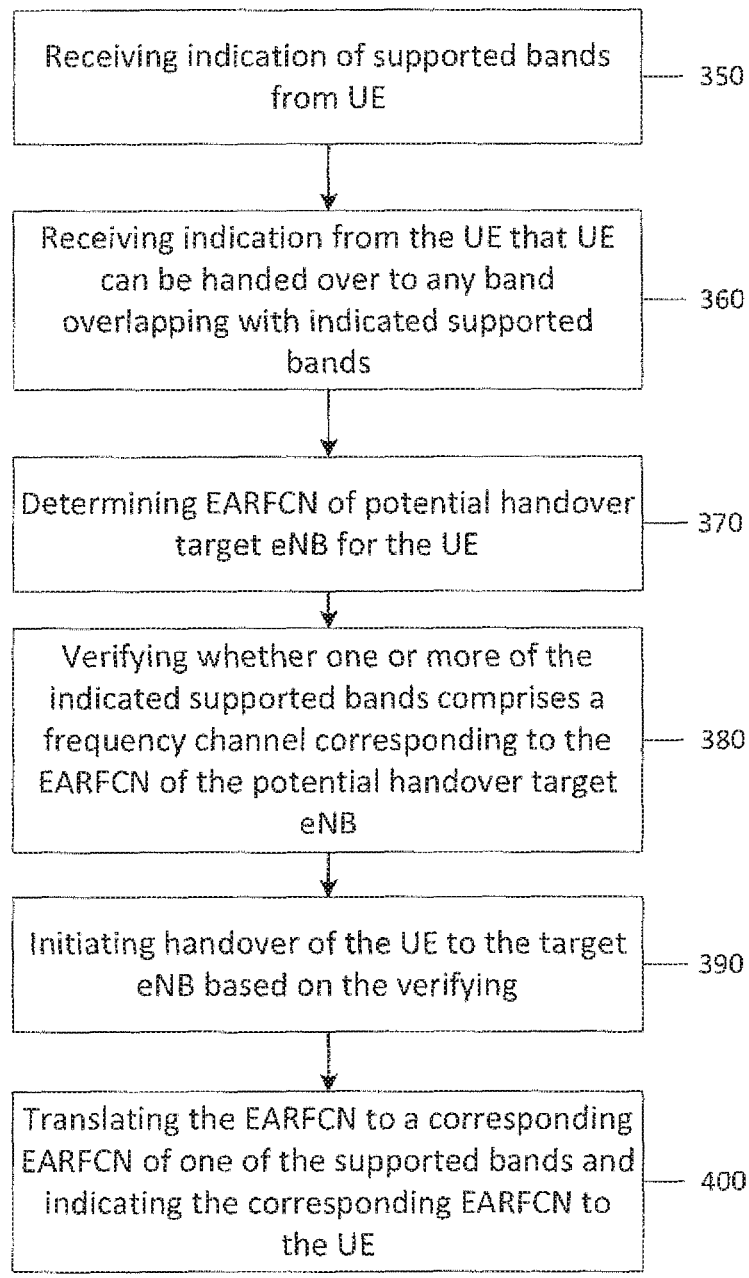
FIG. 3b illustrates a flow diagram of method according to another embodiment.

FIG. 3b illustrates a flow diagram of a method of handover to a cell supporting multiple frequency bands, according to another embodiment. In one example embodiment, the method illustrated in FIG. 3b may be performed by an eNB, such as a serving eNB. According to an embodiment, the method may include, at 350, receiving an indication of supported bands from a UE. The indication of supported bands may be received, for example, in a capability information message. At 360, the method may include receiving an indication, from the UE, that the UE can be handed over to any band overlapping with the supported bands indicated at 350. The method may then include, at 370, determining the EARFCN of a potential handover target eNB for the UE. At 380, the method may include verifying whether at least one of the indicated supported bands comprises a frequency channel that corresponds to the EARFCN of the potential handover target eNB. The method may further include, at 390, initiating handover of the UE to the target eNB based on the verification performed at 380. In an embodiment, the method may also include, at 400, translating the EARFCN to a corresponding EARFCN of one of the supported bands and indicating the corresponding EARFCN to the UE for purposes of measurement, for example.

Figure 4:
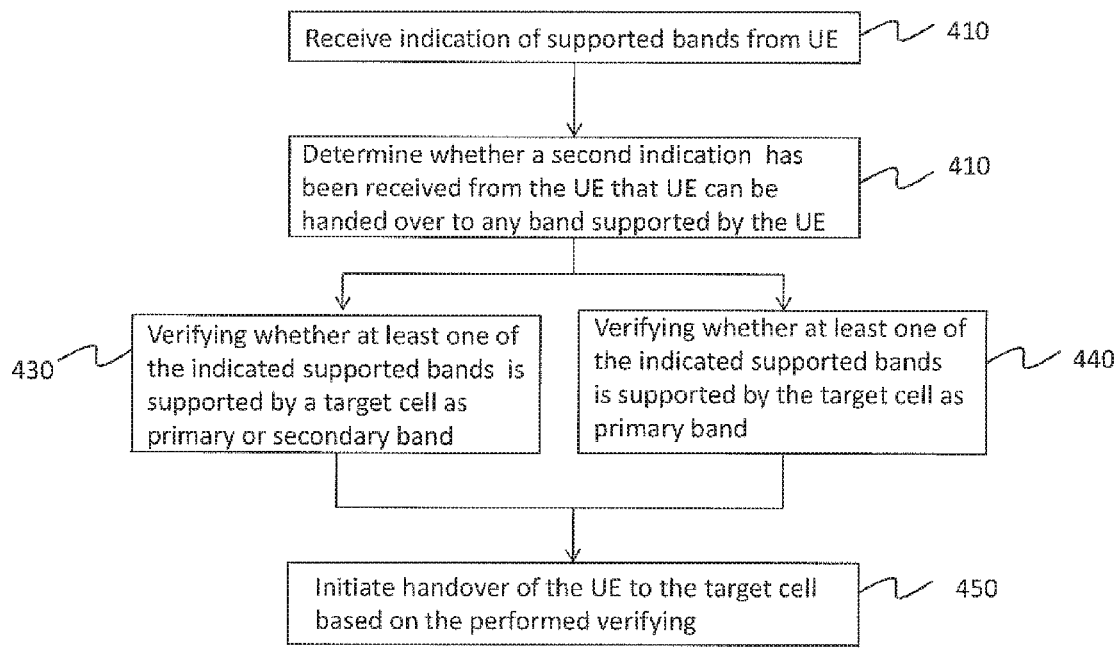
FIG. 4 illustrates a flow diagram of method according to another embodiment.

FIG. 4 illustrates a flow diagram of a method of handover to a cell supporting multiple frequency bands according to another embodiment. In one example embodiment, the method illustrated in FIG. 4 may be performed by an eNB, such as a serving eNB. According to an embodiment, the method may include, at 410, receiving an indication of supported bands from a UE. The indication of supported bands may be received, for example, in a capability information message. At 420, the method may include determining whether a second indication has been received from the UE that the UE can be handed over to any band supported by the UE. The second indication may be received, for example, in the same capability information message. At 430, the method may further include, if the second indication has been received, verifying whether at least one of the indicated supported bands is supported by a target cell as primary band or secondary band. At 440, the method may further include, if the second indication has not been received, verifying whether at least one of the indicated supported bands is supported by the cell as primary band. The method may further include, at 450, initiating handover of the UE to the target cell based on the performed verifying.

In an alternative embodiment, the second indication may be an indication whether the UE can be handed over to secondary bands of any target cell or an indication whether the UE can be handed over to cells supporting any of the UE supported bands but not broadcasting any of the UE supported bands as primary band. The second indication may also be an indication that the UE will not autonomously terminate connection with a target cell if the target cell does not transmit any of the UE supported bands as primary band.

In some embodiments, the functionality of any of the methods described herein, such as those of FIGS. 3a, 3b, and 4, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Certain embodiments of the invention provide several advantages. For example, as a result of some embodiments, handover can be performed to multiple frequency band cells regardless of whether such cells broadcast support for such multiple frequency bands as primary band, or at all. In addition, according to certain embodiments, the UE capability message size is optimized. Also, embodiments allow more UEs to be handed over to a cell using multiple frequency band indicators.

In view of the above, one embodiment of the invention may be directed to an apparatus including at least one processor and at least one memory including computer program code. The at least one memory and the computer program code are configured, with the at least one processor, to cause the apparatus at least to indicate the supported bands of the apparatus to a serving eNB, indicate to the serving eNB that the apparatus can be handed over to any band overlapping with the indicated supported bands, and receive the EARFCN of the target eNB from the serving eNB and connect to the target eNB regardless of whether the EARFCN corresponds to any band indicated by the target eNB as being supported and/or regardless of whether the EARFCN is equal to an EARFCN indicated as being used by the target eNB.

Another embodiment of the invention may be directed to an apparatus including at least one processor and at least one memory including computer program code. The at least one memory and the computer program code are configured, with the at least one processor, to cause the apparatus at least to receive an indication of supported bands from a UE, determine whether a second indication has been received from the UE that the UE can be handed over to any band supported by the UE, based on the determining, if the second indication has been received, verifying whether at least one of the indicated supported bands is supported by a target cell as primary band or secondary band and if the second indication has not been received, verifying whether the at least one of the indicated supported bands is supported by the target cell as primary band, and further initiating handover of the UE to the target cell based on the performed verifying.

Another embodiment of the invention may be directed to an apparatus including at least one processor and at least one memory including computer program code. The at least one memory and the computer program code are configured, with the at least one processor, to cause the apparatus at least to receive an indication of supported bands from a UE, receive an indication from the UE that the UE can be handed over to any band overlapping with the indicated supported bands, determine the EARFCN of a potential handover target eNB for the UE, verify whether at least one of the indicated supported bands comprises a frequency channel corresponding to the determined EARFCN of the potential handover target eNB, and initiate the handover of the UE to the target eNB based on the verification of whether at least one of the indicated supported bands comprises a frequency channel corresponding to the determined EARFCN.

Another embodiment is directed to a method. The method may include indicating, by a UE, supported bands to a serving eNB, and indicating to the serving eNB that the UE can be handed over to any band overlapping with the supported bands. The method may also include receiving the EARFCN of a target eNB from the serving eNB, and connecting to the target eNB regardless of whether the EARFCN corresponds to any band indicated by the target eNB as being supported and/or regardless of whether the EARFCN is equal to an EARFCN indicated as being used by the target eNB.

An additional embodiment is directed to a method. The method may include receiving, by a serving eNB, an indication of supported bands from a UE. The method may also include receiving an indication, from the UE, that the UE can be handed over to any band overlapping with the supported bands. The method may further include determining the EARFCN of a potential handover target eNB for the UE, and verifying whether at least one of the indicated supported bands comprises a frequency channel corresponding to the EARFCN of the potential handover target eNB. The method may then include initiating handover of the UE to the target eNB based on the verification.

Another embodiment may include a computer program embodied on a computer readable medium. The computer program may be configured to control a processor to perform a process. The process may include indicating, by a UE, supported bands to a serving eNB, and indicating to the serving eNB that the UE can be handed over to any band overlapping with the supported bands. The process may also include receiving the EARFCN of a target eNB from the serving eNB, and connecting to the target eNB regardless of whether the EARFCN corresponds to any band indicated by the target eNB as being supported and/or regardless of whether the EARFCN is equal to an EARFCN indicated as being used by the target eNB.

An additional embodiment may be directed to a computer program embodied on a computer readable medium. The computer program may be configured to control a processor to perform a process. The process may include receiving, by a serving eNB, an indication of supported bands from a UE. The process may also include receiving an indication, from the UE, that the UE can be handed over to any band overlapping with the supported bands. The process may further include determining the EARFCN of a potential handover target eNB for the UE, and verifying whether at least one of the indicated supported bands comprises a frequency channel corresponding to the EARFCN of the potential handover target eNB. The process may then include initiating handover of the UE to the target eNB based on the verification.

One having ordinary skill in the art will readily understand that the embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
   at least one processor and at least one memory including computer program code, the at least one memory and the computer program code configured, with the at least one processor, to cause the apparatus at least to
   indicate at least one supported band of the apparatus to a serving station;
   indicate to the serving station that the apparatus can be handed over to any band overlapping with the indicated at least one supported band;
   receive an absolute radio frequency channel number of a target station from the serving station and connect to the target station regardless of whether the absolute radio frequency channel number corresponds to any band indicated by the target station as being supported and/or regardless of whether the absolute radio frequency channel number is equal to an absolute radio frequency channel number indicated as being used by the target station; and
   wherein the indication to the serving station that the apparatus can be handed over to any band overlapping with the indicated at least one supported bands further comprises an indication that the apparatus will not autonomously terminate connection with a target cell if the target cell does not transmit in any of the indicated at least one supported band.

2. The apparatus according to claim 1, wherein whether a band is supported by the target station is determined from a FreqBandIndicator indication received from the target station.

3. The apparatus according to claim 1, wherein said receiving and connecting occur in a RRC_CONNECTED mode.

4. The apparatus according to claim 1, wherein the absolute radio frequency channel number indicated as being used by the target station is defined in a protocol release that is later than a protocol release supported by the apparatus.

5. An apparatus, comprising:
   at least one processor and at least one memory including computer program code, the at least one memory and the computer program code configured, with the at least one processor, to cause the apparatus at least to
   indicate at least one supported band of the apparatus to a serving station;
   indicate to the serving station that the apparatus can be handed over to any band overlapping with the indicated at least one supported band; and
   receive an absolute radio frequency channel number of a target station from the serving station and connect to the target station regardless of whether the absolute radio frequency channel number corresponds to any band indicated by the target station as being supported and/or regardless of whether the absolute radio frequency channel number is equal to an absolute radio frequency channel number indicated as being used by the target station; and
   connect to the target station regardless of whether any of the indicated at least one supported band is among the at least one band indicated as supported by the target station.

6. The apparatus according to claim 5, wherein whether a band is supported by the target station is determined from a FreqBandIndicator indication received from the target station.

7. The apparatus according to claim 5, wherein said receiving and connecting occur in a RRC_CONNECTED mode.

8. The apparatus according to claim 5, wherein the absolute radio frequency channel number indicated as being used by the target station is defined in a protocol release that is later than a protocol release supported by the apparatus.

9. A method, comprising:
   indicating, by a user equipment, at least one supported band of the user equipment to a serving station;
   indicating to the serving station that the user equipment can be handed over to any band overlapping with the indicated at least one supported band; and receiving an absolute radio frequency channel number of a target station from the serving station and connecting to the target station regardless of whether the absolute radio frequency channel number corresponds to any band indicated by the target station as being supported and/or regardless of whether the absolute radio frequency channel number is equal to an absolute radio frequency channel number indicated as being used by the target station;

wherein the indication to the serving station that the user equipment can be handed over to any band overlapping with the indicated at least one supported bands further comprises an indication that the user equipment will not autonomously terminate connection with a target cell if the target cell does not transmit in any of the indicated at least one supported band.

10. The method according to claim 9, wherein whether a band is supported by the target station is determined from a FreqBandIndicator indication received from the target station.

11. The method according to claim 9, wherein said receiving and connecting occur in a RRC_CONNECTED mode.

12. The method according to claim 9, wherein the absolute radio frequency channel number indicated as being used by the target station is defined in a protocol release that is later than a protocol release supported by the user equipment.

13. A method, comprising:
indicating, by a user equipment, at least one supported band of the user equipment to a serving station:
indicating to the serving station that the user equipment can be handed over to any band overlapping with the indicated at least one supported band; and
receiving an absolute radio frequency channel number of a target station from the serving station and connecting to the target station regardless of whether the absolute radio frequency channel number corresponds to any band indicated by the target station as being supported and/or regardless of whether the absolute radio frequency channel number is equal to an absolute radio frequency channel number indicated as being used by the target station;
connecting to the target station regardless of whether any of the indicated at least one supported band is among the at least one band indicated as supported by the target station.

14. The method according to claim 13, wherein whether a band is supported by the target station is determined from a FreqBandIndicator indication received from the target station.

15. The method according to claim 13, wherein said receiving and connecting occur in a RRC_CONNECTED mode.

16. The method according to claim 13, wherein the absolute radio frequency channel number indicated as being used by the target station is defined in a protocol release that is later than a protocol release supported by the user equipment.

17. An apparatus, comprising:
at least one processor and at least one memory including computer program code, the at least one memory and the computer program code configured, with the at least one processor, to cause the apparatus at least to
receive an indication of at least one supported band from a user equipment;
determine whether a second indication has been received from the user equipment that the user equipment can be handed over to any band overlapping with the indicated at least one supported band;
determine an absolute radio frequency channel number of a potential handover target station for the user equipment;
when the second indication has been received, verify whether at least one of the indicated at least one supported band comprises a frequency channel corresponding to the determined absolute radio frequency channel number of the potential handover target station; and
initiate a handover of the user equipment to the target station based on the verification of whether at least one of the indicated at least one supported band comprises a frequency channel corresponding to the determined absolute radio frequency channel number;
wherein the band of the absolute radio frequency channel number of the potential handover target station is not among the indicated supported bands.

18. The apparatus according to claim 17, wherein the at least one memory and the computer program code are further configured, with the at least one processor, to cause the apparatus at least to:
when the second indication has not been received, not initiate a handover of the user equipment to the potential handover target station when the indicated supported bands do not comprise the absolute radio frequency channel number of the potential handover target station.

19. The apparatus according to claim 17, wherein the absolute radio frequency channel number of the potential handover target station corresponds to a FreqBandIndicator indication transmitted by the target station.

20. The apparatus according to claim 17, wherein the second indication further comprises an indication that the user equipment will not autonomously terminate connection with a target cell if the target cell does not transmit in any of the indicated at least one supported band.

* * * * *